Patented Apr. 23, 1946

2,398,990

UNITED STATES PATENT OFFICE 2,398,990

ARALKYLATED SULPHAMIDES AND PROCESS OF MAKING SAME

Otto Albrecht, Neuewelt, near Basel, Switzerland, assignor to the Swiss firm of Society of Chemical Industry in Basle, Basel, Switzerland No Drawing. Application February 5, 1943, Serial No. 474,900. In Switzerland January 19, 1942

4 Claims. (Cl. 260—457)

It has been found that new sulphamide derivatives are obtained if sulphamides which contain at least one hydrogen atom belonging to a sulphamide group are reacted with aralkylating agents and a water-solubilizing step is effected in so far as the parent materials do not already contain water-solubilizing groups.

Sulphamides which can be used are, for example, those of the aliphatic series, such as ethane sulphoric acid amide, octane sulphonic acid amide, cetyl sulphonic acid amide, also mixtures of sulphamides such as are obtained by treatment of aliphatic hydrocarbons with chlorine and sulphur dioxide, if desired, during irradiation with chemically active light, and subsequent action of ammonia or of primary amines. Furthermore, aromatic sulphamides and their partially hydrogenated derivatives form suitable parent materials; among these may be mentioned benzene sulphamide, p-toluene sulphamide, xylene sulphamide, cymene sulphamide, chlorocymene sulphamide, sulphamides of naphthalene, isopropyl-, di-isopropyl-, butyl-, and dibutyl-naphthalene, sulphamides of tetrahydronaphthalene; also sulphamides of diphenyl, anthracene, phenanthrene, acenaphthene, and of the partially hydrogenated hydrocarbons derived therefrom; as well as sulphamides from partially hydrogenated, highly condensed, aromatic hydrocarbons, such as may be obtained, for example, by the action of aluminum chloride on tetrahydronaphthalene in known manner. Apart from the halogen atoms already mentioned, the sulphamides can also contain further substituents, such as hydroxyl groups, amino groups, substituted—for example acylated—amino groups, methoxy groups, etc. Examples of these substituted sulphamides are N-monohydroxyalkyl-sulphamides, such as N-hydroxyethylcymene sulphamide.

As water-solubilizing groups, the sulphamides can contain, for example, sulphonic acid groups, neutralized carboxyl, sulphuric acid ester, or thiosulphuric acid groups. Sulphonic acids and acid sulphuric acid esters contain sulphuric acid radicals as water-solubilizing groups. Such water-solubilizing groups can be contained in a radical united to the sulphur atom of the sulphamide group, for example, in an aromatic nucleus, or also in a radical united to the nitrogen atom of the sulphamide group. Examples of sulphamides of this nature are 4-(phenyl-sulphamino)-benzene-1- sulphonic acid, 4-(1'-methyl-4'-isopropyl-phenylsulphamino) - benzene-1-sulphonic acid, 2-(3'-aminophenyl - sulphamino)-naphthalene-6:8-disulphonic acid. These sulphamides are readily obtainable by reacting aryl sulphonic acid chlorides—if desired, nitrated—such as cymene sulphonic acid chloride, 3-nitrobenzene sulphonic acid chloride, with aminoarylsulphonic acids, such as sulphanilic acid, 2-aminonaphthalene-6:8-disulphonic acid in the usual manner, if desired, with subsequent reduction of a nitro group. The reaction products of primary sulphamides with halogencarboxylic acids, such as chloracetic acid, also with salts of aldehyde-bisulphite compounds or of aldehyde-sulphoxylic acids also come into consideration. Products of this nature are obtained for example, by heating sulphamides with solid sodium formaldehyde bisulphite to about 150–200° C., if desired, in the presence of secondary amines, or with dry sodium formaldehyde sulphoxylate to about 100–120° C., for example, according to the processes described in U. S. patent applications Serial No. 447,145 (filed June 15, 1942) and Serial No. 443,662 (filed May 19, 1942). The condensation products of aminoarylsulphonic acids with chloroacetylated sulphamides also form suitable parent materials; as representatives of this type of sulphamide mention may be made of the condensation products—obtainable in the usual manner—of 2-aminonaphthalene-6-sulphonic acid or of 2-aminonaphthalene-6:8-disulphonic acid with N-chloracetylcymene sulphamide or N-chloracetyltetrahydronaphthalene sulphamide.

Particularly suitable for use as aralkylating agents are the chloromethyl compounds of aromatic or partially hydrogenated aromatic compounds, such as benzyl chloride, chloromethyltoluene, chloromethyl-xylene, chloromethyl-cumene, 2-chloromethylcymene (cymyl chloride), 1-chloromethyl-naphthalene, chloromethyltetra-hydronaphthalenes, for example, ar-2-chloromethyl-tetrahydronaphthalene, chloromethyl-cyclohexyl-benzene (obtainable, for example, by treatment of the addition product of benzene and cyclohexene with formaldehyde, aqueous hydrochloric acid and hydrogen chloride at 60–70° C.), chloromethyl compounds of highly condensed aromatic ring systems and of their partially hydrogenated derivatives, for example, chloromethyl-anthracene, chloromethyl-octahydroanthracene, chloromethyl-octahydrophenanthrene.

The chloromethyl derivatives of aromatic and partially hydrogenated aromatic hydrocarbons which are not yet described in the literature can be prepared without trouble according to analogous processes, for example, by introducing hydrogen chloride gas into a mixture, heated to 60–70° C., of the hydrocarbons, concentrated formaldehyde soltuion and concentrated aqueous hydrochloric acid, if necessary, plus an addition of zinc chloride.

As aralkylating agents chloromethyl derivatives of hydroxyaryl compounds, for example, the chloromethyl compound of the phenol-like addition product of phenol and dipentene, also chloromethyl compounds of ethers containing aryl radicals, such as the chloromethyl compound of the ether obtained by condensation of dipentene with β-naphthol, also come into consideration. These chloromethyl compounds can be prepared from hydroxyaryl compounds and their ethers—some of which are described, some available directly by analogous processes—in the manner already described above for the chloromethyl derivatives of hydrocarbons.

The reaction between the sulphamides and the aralkylating agents preferably takes place at raised temperature, advantageously in the presence of acid-binding agents, such as sodium hydroxide. It is possible, for example, to react the aralkyl chloride with aqueous solutions of the alkali salts of the sulphamides at 60–70° C., the solution being maintained alkaline in reaction by adding sodium hydroxide.

In order to introduce the water-solubilizing groups, the products of the present invention—so far as they still contain a hydrogen atom belonging to a sulphamide group—can, for example, be reacted with halogencarboxylic acids, such as chloracetic acid, also with halogensulphonic acids, such as bromethane sulphonic acid, preferably in the presence of acid-binding agents, such as sodium hydroxide. Products which contain easily sulphonatable aromatic nuclei or hydroxyl groups, for example, hydroxyethyl groups, can be made water soluble by treatment with sulphonating agents, such as concentrated sulphuric acid, addition products of sulphur trioxide and tertiary amines. Hyroxyethyl groups, for instance, may be transformed into acid sulphuric acid ester groups by a sulphonation process under mild conditions, for instance, in the presence of diluents at a low temperature.

The products of the present invention may be designated as sulphamides which are substituted at the amide nitrogen atom by at least one aralkyl radical containing at least 8 carbon atoms, which products are solid to liquid substances which are decomposed by prolonged heating with concentrated hydrochloric acid. The products containing at least one water-solubilizing group differing from the sulphamide group are in the form of the alkali metal salts soluble to easily dispersible in water. Products obtained with the aid of 2-chlormethyl cymene contain cymylmethyl radicals of the formula

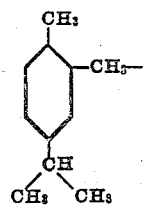

The reaction with ar-2-chlormethyl-tetrahydronaphthalene yields aralkylated sulphamides containing tetrahydronaphthylmethyl radicals of the formula

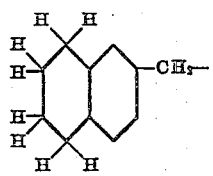

Thanks to their capillary activity, the products of the present invention can be used as textile auxiliary products, for example, as wetting, dispersing, washing, softening, levelling, or foaming agents. Products containing nuclear alkylated benzyl radicals, especially those having two radicals introduced by means of chloromethylcymene, are excellent wetting agents; products containing tetrahydronaphthylmethyl radicals are remarkable for their good washing action.

The products of the present invention can be used alone or in conjunction with other substances, such as inorganic salts, which are commonly used in combination with textile auxiliary products.

*Example 1*

7 parts of the condensation product obtained by the reaction of cymene sulphamide with sodium formaldehyde-bisulphite of the probable formula

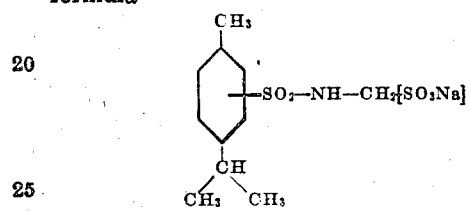

are dissolved in 14 parts by volume of water and 3.2 parts of ar-2-chloromethyl-tetrahydronaphthalene and 2.9 parts of sodium hydroxide solution of 30% strength are allowed to run into the solution in the course of 1 hour whilst stirring at 65–70° C. Stirring is continued at the temperature given for some time, and the excess of sodium hydroxide is then neutralized and the reaction mixture evaporated to dryness. The powder thus obtained is dissolved by water to give a clear, foaming solution having good washing power.

It most probably corresponds to the formula

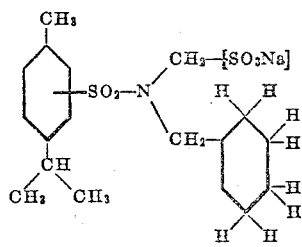

The formula [SO₃Na] for the water-solubilizing group is intended to express that it is not known whether the —CH₂— group is bound to the sulphur atom or to an oxygen atom of the —SO₃Na group. In other words, it is uncertain whether the solubilizing group is bound according to the formula

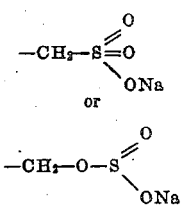

The condensation product of cymene sulphamide with sodium formaldehyde-bisulphite used as parent material can be obtained by heating 53 parts of cymene sulphamide (a mixture of the isomeric sulphamides obtainable by converting cymene into the sulphochloride by means of chlorsulphonic acid and subsequent action of ammonia thereon), 50 parts of sodium formaldehyde-bisulphite, and 2.5 parts of diamylamine for about 20 minutes at 160–165° C.

The product obtained by condensing a sulphamide of an aliphatic hydrocarbon containing 8–18 carbon atoms with sodium formaldehyde sulphoxylate may be aralkylated with ar-2-chlormethyltetrahydronaphthalene in a similar manner.

*Example 2*

10 parts of the product obtained by the reaction of tetrahydronaphthalene-sulphamide with sodium formaldehyde-bisulphite are dissolved in 20 parts by volume of water, and 4.4 parts of ar-2-chloromethyl-tetrahydronaphthalene and 3.9 parts of sodium hydroxide solution of 30% strength are allowed to run into the solution in the course of 2 hours whilst stirring at 65–70° C. The reaction mixture is then stirred at the temperature given until a sample gives a clear solution in warm water, which is usually the case after a short time. The mixture is then neutralized with sulphuric acid and evaporated to dryness. The product thus obtained, which is a readily pulverized, solid mass, dissolves in warm water to yield a clear, foaming solution possessing good washing powers. It probably corresponds to the formula

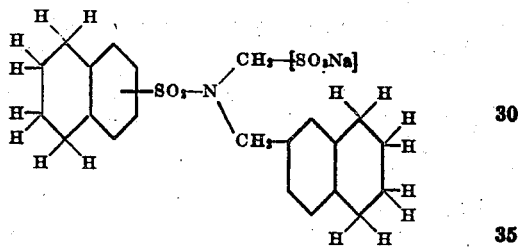

The reaction product of tetrahydronaphthalene sulphamide and sodium formaldehyde-bisulphite used as parent material can be obtained by heating 21 parts of tetrahydronaphthalene sulphamide (mixture of the isomeric sulphamides obtainable by treating tetrahydronaphthalene with chlorosulphonic acid and subsequently reacting the product with ammonia), 20 parts of sodium formaldehyde-bisulphite and 1.2 parts of diamylamine for about 1 hour at 160–165° C.

*Example 3*

10 parts of the product obtained by reacting cymene sulphamide with sodium formaldehyde-sulphoxylate are dissolved in 20 parts by volume of water, and 5.8 parts of technical chloromethyl-cymene and 5.1 parts of sodium hydroxide solution of 30% strength are allowed to run in during about 1½ hours whilst stirring at 65–70° C. Stirring is continued for some time at the temperature given, when the mixture is neutralized with sulphuric acid and evaporated to dryness. The product thus obtained is a powder which is dissolved by warm water to yield a foaming solution of good wetting and washing power. It probably corresponds to the formula

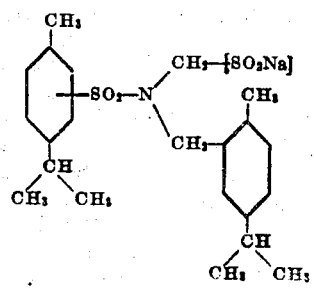

The reaction product of cymene sulphamide and sodium formaldehyde-sulphoxylate used as parent material is obtainable by heating 10.6 parts of cymene sulphamide (mixture of the isomeric sulphamides obtained by treating cymene with chlorosulphonic acid and subsequent action of ammonia) with 8.5 parts of sodium formaldehyde-sulphoxylate for about 20 minutes at 120° C.

*Example 4*

9.3 parts of the product obtained by reacting tetrahydronaphthalene sulphamide with sodium formaldehyde-sulphoxylate are dissolved in 20 parts by volume of water, and 5.4 parts of ar-2-chloromethyltetrahydronaphthalene and 4.8 parts of sodium hydroxide solution of 30% strength are allowed to run into the solution during about 2 hours whilst stirring at 65–70° C. Stirring is continued for about 1 hour at the temperature given, after which the reaction mixture, which should give a clear solution on dilution with water, is neutralized with sulphuric acid and evaporated to dryness. The product thus obtained is an almost colourless power which dissolves in warm water to give a foaming solution of good washing power. It probably corresponds to the formula

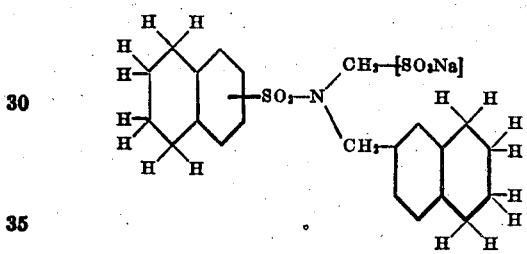

The reaction product of tetrahydronaphthalene sulphamide with sodium formaldehyde-sulphoxylate mentioned above can be obtained by heating 10.5 parts of tetrahydronaphthalene sulphamide (mixture of the isomeric sulphamides obtained by treatment of tetrahydronaphthalene with chlorsulphonic acid and subsequent reaction with ammonia) with 6.5 parts of anhydrous sodium formaldehyde-sulphoxylate for about 20 minutes at 115–120° C.

*Example 5*

7.2 parts of the reaction product of sodium formaldehyde sulphoxylate with the sulphamide obtained from a mixture of polycyclic, partially hydrogenated aromatic hydrocarbons are dissolved in 14 parts by volume of water, and 3–6 parts of ar - 2-chloromethyltetrahydronaphthalene and 3.2 parts of a solution of sodium hydroxide of 30% strength are allowed to run into the solution in the course of 2 hours whilst stirring at 65–70° C. The reaction mixture is then stirred for a time at the temperature given until the reaction product is soluble in water to a clear solution, which usually takes a short time. The alkaline reaction solution is then neutralized and evaporated to dryness, a solid, easily pulverized mass being obtained which dissolves in warm water to yield a foaming solution of good washing power, especially towards wool.

The condensation product, obtained by the use of sodium formaldehyde-sulphoxylate, which is used as parent material can be prepared a follows:

Tetrahydronaphthalene is partially converted in known manner into a mixture of highly condensed, polycyclic and partially hydrogenated hydrocarbons, containing among other things octahydroanthracene and octahydrophenanthrene, by heating with aluminium chloride at 100° C. and is freed from low boiling point constituents (benzene and tetrahydronaphthalene). The mixture of higher hydrocarbons thus obtained is thereupon converted into a mixture of sulphonic acid chlorides by the action of chlorosulphonic acid at —5 to —10° C. and, subsequently, into a mixture of sulphamides by the action of aqueous ammonia. 2 parts of the mixture of sulphamides thus obtained are then heated with 1.4 parts of anhydrous sodium formaldehyde-sulphoxylate for about ½ hour at 115–120° C.

Example 6

20.8 parts of the sodium salt of tetrahydronaphthalene-sulphaminoacetic acid are dissolved in 30 parts of water, and 12.8 parts of ar-2-chloromethyl-tetrahydronaphthalene and 9.5 parts of a solution of sodium hydroxide of 30% strength are allowed to run into the solution during 2 hours whilst stirring at 65–70° C. The reaction mixture is stirred on the boiling water bath for some hours, neutralized and evaporated to dryness. The product thus obtained is a solid, easily powdered mass which is dissolved by warm water to yield a foaming solution of good washing power. It corresponds to the formula

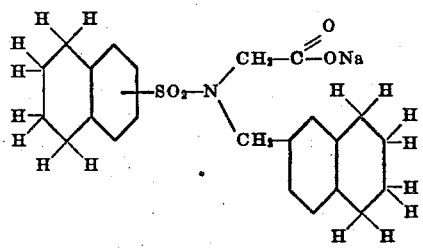

The sodium salt of tetrahydronaphthalenesulphaminoacetic acid used as parent material can be prepared in known manner by treating technical tetrahydronaphthalene sulphamide with chloroacetic acid in aqueous alkaline solution.

Example 7

A solution of 3.5 parts of chlorosulphonic acid in 10 parts by volume of ether is dropped during ½ hour at 0–5° C. into a solution of 10 parts N-hydroxyethyl - N - cymylmethyl-cymene sulphamide in 10 parts by volume of ether. The reaction mixture is then stirred for 2 hours at 20–25° C. and is allowed to stand overnight, after which it is poured into water and neutralized with sodium hydroxide solution. Solid sodium chloride is now added. The sodium salt of the new sulphuric acid ester which has been obtained by salting out is a solid, pulverizable mass when dry and is dissolved by warm water to yield a clear, foaming solution of high wetting power. An addition of sodium sulphate is advisable when using it as a wetting agent. The new product corresponds to the formula

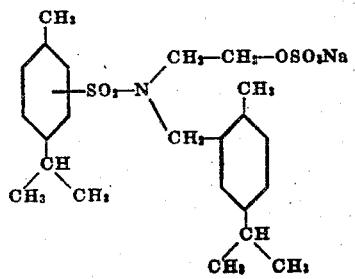

The N-hydroxyethyl - N - cymylmethylcymene sulphamide mentioned above can be prepared as follows:

41.4 parts of N-hydroxyethylcymene sulphamide of the formula

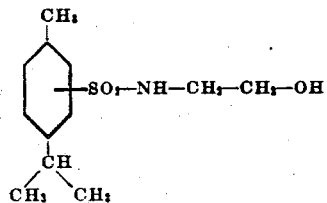

obtained by the conversion of cymene into the mixture of the two isomeric sulphonic acid chlorides by means of chlorosulphonic acid and subsequent reaction with monoethanolamine, are dissolved in 300 parts by volume of alcohol; 26.6 parts of a solution of sodium hydroxide of 30% strength are added, and 36.5 parts of 2-chloromethylcymene (obtained, for example, by introducing hydrogen chloride gas into a mixture of cymene, formaldehyde and concentrated hydrochloric acid at 60–70° C.) are allowed to drop into the reaction mixture during ¼ hour whilst stirring. The reaction mixture is then heated to the boil for 4 hours whilst stirring, the sodium chloride which separates is removed from the almost neutral reaction solution, volatile constituents are removed by steam distillation, and the N - hydroxyethyl-N-cymylmethylcymene sulphamide thus obtained is dried. Instead of N-hydroxyethyl-N-cymylmethyl-cymene sulphamide the corresponding N-tetrahydronaphthylmethyl derivative or the N-hydroxyethyl-N-cymylmethyl tetrahydronaphthalene sulphamide may be treated with chlorsulfonic acid in a similar manner.

Example 8

15 parts of the condensation product obtained from the disodium salt of 2-aminonaphthalene-6:8-disulphonic acid and monochloracetyl-tetrahydronaphthalene sulphamide of the formula

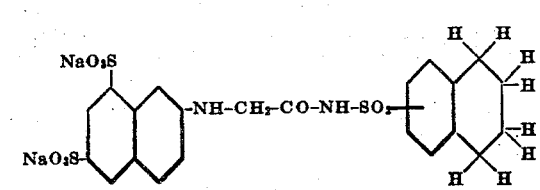

are dissolved in about 25 parts by volume of water at 70° C., and 4.5 parts (1 mol) of ar-2-chloromethyltetrahydronaphthalene and 3.7 parts of sodium hydroxide solution of 30% strength are introduced during 1 hour whilst stirring at about 65–70° C. After stirring for about ½ hour, the reaction product gives a clear solution in water. A further 4.5 parts of ar-2-chloromethyltetrahydronaphthalene (1 mol) and 3.7 parts of sodium hydroxide solution of 30% strength are then added at the same temperature in the course of about ½ hour. After stirring for about a further 2 hours at 65–70° C. the reaction product gives a clear solution in water. After drying, the new condensation product is a solid, pulverizable mass which dissolves in water to give a clear, foaming solution of good washing powers. It most probably corresponds to the formula

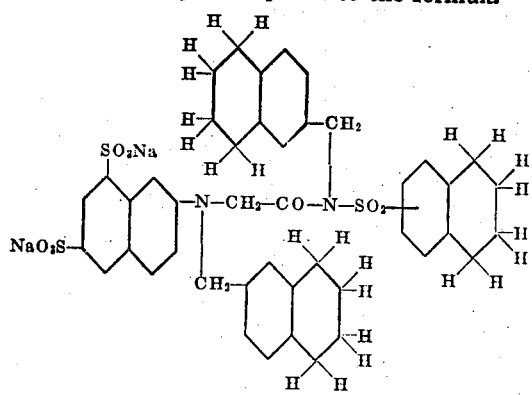

The above mentioned condensation product of the disodium salt of 2-aminonaphthalene-6:8-disulphonic acid and monochloracetyltetrahydronaphthalene sulphamide can be prepared in the following manner:

46 parts of tetrahydronaphthalene sulphamide, obtained by treatment of tetrahydronaphthalene with chlorosulphonic acid and subsequent reaction of the mixture of isomeric sulphonic acid chlorides thus obtained with ammonia, are heated with 24.6 parts of chloracetyl chloride in the course of 2 hours to about 100° C., and heating is continued for about a further 3½ hours at the same temperature. 14.4 parts of the chloracetyl derivative thus obtained are mixed with 6.7 parts of a sodium hydroxide solution of 30% strength and 7.5 parts by volume of alcohol and are dropped into a solution of 24.3 parts of acid sodium 2:6:8-naphthylamine disulphonate (containing 62.4% free disulphonic acid) in about 50 parts by volume of water, which has been neutralized with sodium carbonate, in the course of 2 hours whilst stirring at 65–70° C. The reaction liquor must be maintained in a slightly alkaline condition by addition of sodium hydroxide solution. Stirring is continued for a further 2½ hours at the temperature stated, care being taken that the weakly alkaline reaction of the mixture is maintained, and the reaction product, which gives a clear solution in water, is then evaporated to dryness.

The 1:5-amino naphthalene sulphonic acid instead of the 2:6:8-amino naphthalene disulphonic acid may be treated in a similar manner.

*Example 9*

In order to wash 50 kgs. of woolen yarn, a bath is prepared containing 1 gm. of the product of Example 8 per litre of water at 45° C. (liquor ratio 1:20). The material is entered into the bath, turned for ½ hour and rinsed. After this treatment the woolen yarn is excellently clean and can be dyed directly without difficulty.

What I claim is:

1. An alkali metal salt of a sulphamide of the formula

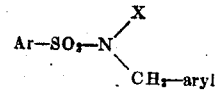

wherein Ar represents a member selected from the group consisting of phenyl, p-tolyl, xylyl, cymyl and chlorocymyl, CH₂-aryl represents an aralkyl radical selected from the group consisting of cymylmethyl and tetrahydronaphthylmethyl, and X is an alkyl radical containing a water-solubilizing group selected from the class consisting of sulphonic acid groups, sulphinic acid groups and sulphuric acid ester groups.

2. An alkali metal salt of the acid sulphuric acid ester of the formula

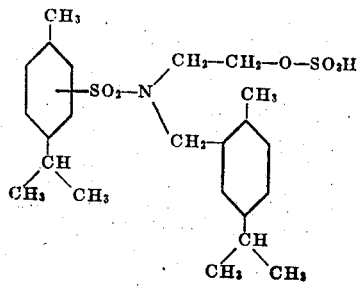

3. An alkali metal salt of the sulphamide of the formula

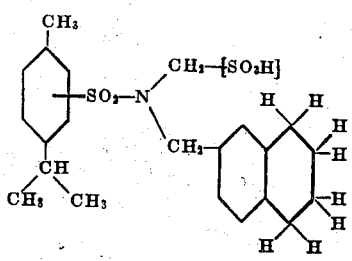

4. An alkali metal salt of the sulphamide of the formula

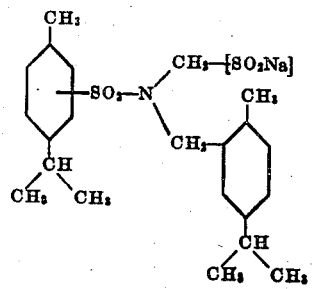

OTTO ALBRECHT.

Certificate of Correction

April 23, 1946.

Patent No. 2,398,990.        OTTO ALBRECHT

It is hereby certified that errors appear in the printed specification of the above numbered patent requiring correction as follows: Page 2, second column, lines 43 to 49, Example 1, for that portion of the formula reading

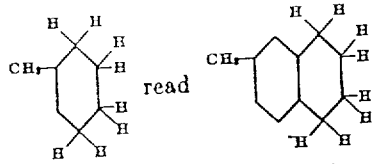

read page 3, second column, line 28, Example 4, for that portion of the formula reading

[SO₄Na]  read  [SO₂Na]

and that the said Letters Patent should be read with these corrections therein that the same may conform to the record of the case in the Patent Office.

Signed and sealed this 30th day of July, A. D. 1946.

[SEAL]

LESLIE FRAZER,
*First Assistant Commissioner of Patents.*